United States Patent
Tetsumoto

(10) Patent No.: US 9,557,109 B2
(45) Date of Patent: *Jan. 31, 2017

(54) APPARATUS FOR MANUFACTURING MOLTEN METAL

(75) Inventor: Masahiko Tetsumoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 399 days.

This patent is subject to a terminal disclaimer.

(21) Appl. No.: 13/501,068

(22) PCT Filed: Oct. 8, 2010

(86) PCT No.: PCT/JP2010/067792
§ 371 (c)(1),
(2), (4) Date: Apr. 9, 2012

(87) PCT Pub. No.: WO2011/043473
PCT Pub. Date: Apr. 14, 2011

(65) Prior Publication Data
US 2012/0200013 A1    Aug. 9, 2012

(30) Foreign Application Priority Data

Oct. 8, 2009  (JP) ................. 2009-234364

(51) Int. Cl.
F27D 3/00    (2006.01)
F27D 99/00   (2010.01)
(Continued)

(52) U.S. Cl.
CPC ........... F27B 3/085 (2013.01); C21B 13/026 (2013.01); C21B 13/10 (2013.01); C21B 13/12 (2013.01);
(Continued)

(58) Field of Classification Search
CPC ............ F27B 3/18; F27B 3/08; F27B 3/085;
F27B 3/205; F27B 3/225; C21B 13/026;
C21B 13/10; C21B 13/12; C21B 13/006;
C21C 5/527; C21C 5/565; C21C 5/562;
F27D 17/003; F27D 3/16; F27D
3/18; F27D 25/00; F27D 3/04; C22B
7/02; Y02P 10/216
(Continued)

(56) References Cited

U.S. PATENT DOCUMENTS 3,907,170 A * 9/1975 Schedrin et al. ............... 406/47
4,518,419 A   5/1985 Lugscheider et al.
(Continued)

FOREIGN PATENT DOCUMENTS

CN    1973987 A    6/2007
EP    0 171 385 A1  2/1986
(Continued)

OTHER PUBLICATIONS

U.S. Appl. No. 13/500,790, filed Apr. 6, 2012, Tetsumoto.
(Continued)

*Primary Examiner* — Scott Kastler
*Assistant Examiner* — Michael Aboagye
(74) *Attorney, Agent, or Firm* — Oblon, McClelland, Maier & Neustadt, L.L.P.

(57) ABSTRACT

An apparatus for manufacturing molten metal has a stationary electric furnace, a raw material charging chute, and exhaust duct and a secondary combustion burner in the furnace top, and a shock generator. The raw material charging chute is in one end of the furnace in a width direction and an electric heating region is spaced from the raw material charging chute in the width direction. A raw material layer having a sloping surface extends downward from the one end of the furnace having the raw material charging chute toward the electric heating region, the sloping surface supporting a metal agglomerate raw material layer. The shock
(Continued)

generator is provided at least partially within the raw material and extends to the sloping surface, to be in contact with the metal agglomerate raw material layer, and to mechanically overcome hanging of the metal agglomerate raw material layer on the sloping surface.

9 Claims, 2 Drawing Sheets

(51) Int. Cl.
<table>
<tr><td>F27B 3/08</td><td>(2006.01)</td></tr>
<tr><td>F27B 3/18</td><td>(2006.01)</td></tr>
<tr><td>F27B 3/22</td><td>(2006.01)</td></tr>
<tr><td>F27D 3/16</td><td>(2006.01)</td></tr>
<tr><td>C21B 13/02</td><td>(2006.01)</td></tr>
<tr><td>C21B 13/10</td><td>(2006.01)</td></tr>
<tr><td>C21B 13/12</td><td>(2006.01)</td></tr>
<tr><td>F27D 3/04</td><td>(2006.01)</td></tr>
<tr><td>F27D 25/00</td><td>(2010.01)</td></tr>
<tr><td>C21C 5/56</td><td>(2006.01)</td></tr>
<tr><td>C21B 13/00</td><td>(2006.01)</td></tr>
<tr><td>C22B 7/02</td><td>(2006.01)</td></tr>
</table>

(52) U.S. Cl.
CPC ............... *C21C 5/562* (2013.01); *F27B 3/18* (2013.01); *F27B 3/225* (2013.01); *F27D 3/04* (2013.01); *F27D 3/16* (2013.01); *F27D 25/00* (2013.01); *C21B 13/006* (2013.01); *C22B 7/02* (2013.01); *Y02P 10/216* (2015.11)

(58) Field of Classification Search
USPC ............ 266/144, 200; 75/10.36, 10.4, 10.46, 75/10.59, 10.66
See application file for complete search history.

(56) References Cited

U.S. PATENT DOCUMENTS

<table>
<tr><td>4,644,557</td><td>A</td><td>*</td><td>2/1987</td><td>Ebeling et al. ................. 373/22</td></tr>
<tr><td>5,681,367</td><td>A</td><td></td><td>10/1997</td><td>Hunter</td></tr>
<tr><td>6,149,709</td><td>A</td><td></td><td>11/2000</td><td>Uragami et al.</td></tr>
<tr><td>6,284,018</td><td>B1</td><td></td><td>9/2001</td><td>Uragami et al.</td></tr>
<tr><td>6,419,724</td><td>B1</td><td></td><td>7/2002</td><td>Monteyne</td></tr>
<tr><td>6,614,831</td><td>B2</td><td>*</td><td>9/2003</td><td>Shver .............................. 373/66</td></tr>
<tr><td>6,689,182</td><td>B2</td><td>*</td><td>2/2004</td><td>Tokuda et al. ............... 75/10.66</td></tr>
<tr><td>2003/0070507</td><td>A1</td><td></td><td>4/2003</td><td>Tokuda et al.</td></tr>
<tr><td>2009/0249919</td><td>A1</td><td></td><td>10/2009</td><td>Degel et al.</td></tr>
<tr><td>2011/0036201</td><td>A1</td><td></td><td>2/2011</td><td>Tetsumoto</td></tr>
</table>

FOREIGN PATENT DOCUMENTS

<table>
<tr><td>JP</td><td>51 78711</td><td>7/1976</td></tr>
<tr><td>JP</td><td>59 134482</td><td>8/1984</td></tr>
<tr><td>JP</td><td>64-62438 A</td><td>3/1989</td></tr>
<tr><td>JP</td><td>2000-18830 A</td><td>1/2000</td></tr>
<tr><td>JP</td><td>2000 513411</td><td>10/2000</td></tr>
<tr><td>JP</td><td>2001 515138</td><td>9/2001</td></tr>
<tr><td>JP</td><td>2001 525487</td><td>12/2001</td></tr>
<tr><td>JP</td><td>2003 105415</td><td>4/2003</td></tr>
<tr><td>JP</td><td>2009-522450 A</td><td>6/2009</td></tr>
<tr><td>JP</td><td>2009 280910</td><td>12/2009</td></tr>
<tr><td>KR</td><td>2002-0006207 A</td><td>1/2002</td></tr>
</table>

OTHER PUBLICATIONS

Office Action issued May 28, 2013 in Kazakhstan Application No. 2012/1551.1 (With English Translation).
Combined Office Action and Search Report issued Apr. 28, 2013 in Chinese Patent Application No. 201080044543.3 with English translation of categories of cited documents.
International Search Report Issued Dec. 14, 2010 in PCT/JP10/67792 Filed Oct. 8, 2010.
Extended European Search Report issued Jul. 29, 2015 in Patent Application No. 10822143.3.

* cited by examiner

APPARATUS FOR MANUFACTURING MOLTEN METAL

TECHNICAL FIELD

The present invention relates to an apparatus for manufacturing molten metal by directly reducing and melting a metal agglomerate raw material such as metal oxide agglomerates with carbonaceous material in an electric heating and melting furnace such as an arc furnace without conducting pre-reduction.

BACKGROUND ART

Various proposals have been made for new iron-making processes that substitute existing blast furnace and smelting reduction processes. These proposals relate to the molten metal manufacturing processes for obtaining molten metal, involving pre-reducing metal oxide agglomerates with carbonaceous material in a rotary hearth furnace to form reduced agglomerates and melting the reduced agglomerates in an arc furnace or a submerged arc furnace (for example, refer to Patent Literatures 1 to 4).

However, in the existing processes, two steps (a pre-reduction step using a rotary hearth furnace and a melting step using a melting furnace) must be provided. These processes require equipment or facilities for transferring the reduced agglomerates from the rotary hearth furnace to the melting furnace as well as two exhaust gas processing lines, i.e., one for the rotary hearth furnace and one for the melting furnace. Thus, the facility cost increases, the thermal loss increases, and the energy consumption cannot be sufficiently decreased as total system or process.

The inventor of the present invention has performed thorough studies to provide a specific method for manufacturing molten metal in which a rotary hearth furnace is not used and an electric heating furnace only is used to reduce and melt metal oxide agglomerates with carbonaceous material. As a result, the inventor accomplished an invention described below and filed a patent application for the invention (Japanese Patent Application No. 2009-105397; hereafter, the invention of this patent application is referred to as "earlier invention".)

An apparatus for manufacturing molten metal according to the earlier invention is illustrated in FIGS. 2A and 2B. A stationary non-tilting electric heating furnace, herein, an arc furnace is used that includes raw material charging chutes 4 at both ends 2 of the furnace in the width direction, an electrode 5 in the center position of the furnace in the width direction, and a secondary combustion burner 6 provided in a flat furnace top 1. A carbonaceous material A is charged through the chutes 4 to form a carbonaceous material layer (corresponding to "raw material layer" of the subject invention) 12 having a sloping surface extending downward toward the lower portion of the electrode 5. Metal oxide agglomerates with carbonaceous material B are subsequently charged to form an agglomerate layer (corresponding to "metal agglomerate raw material layer" of the subject invention) 13 on the sloping surface of the carbonaceous material layer 12. Arc heating is then conducted with the electrode 5 to sequentially melt the lower end portion of the agglomerate layer 13 to form a molten metal layer 14 and a molten slag layer 15. At the same time, while the agglomerate layer 13 is allowed to descend along the sloping surface of the carbonaceous material layer 12, the agglomerate layer 13 is heated with radiant heat from secondary combustion by blowing oxygen-containing gas C through the secondary combustion burner 6 to burn CO-containing gas generated from the agglomerate layer 13.

According to the earlier invention, while an agglomerate layer is allowed to move along the sloping surface of a raw material layer formed in a furnace toward an electrode, the agglomerate layer is pre-reduced by heating with radiant heat from secondary combustion by blowing oxygen-containing gas through a secondary combustion burner to burn CO-containing gas generated from the agglomerate layer; and the pre-reduced agglomerate layer is reduced and melted near the electrode by arc heating to form molten metal. Thus, molten metal is directly obtained from metal oxide agglomerates with carbonaceous material by a single process and hence the facility cost and the energy consumption can be considerably decreased, compared with the existing processes.

However, in an apparatus for manufacturing molten metal according to the earlier invention, when agglomerates charged into the furnace have large amounts of powder or agglomerates are sintered or fused together in the furnace, hanging of the agglomerate layer may occur and smooth descent of the agglomerate layer may be inhibited. In this case, agglomerates are not properly reduced or melted by heating and the performance of the apparatus is degraded. When such hanging of the agglomerate layer occurs, it is impossible to overcome the hanging without terminating the furnace operation in an apparatus for manufacturing molten metal according to the earlier invention.

CITATION LIST

Patent Literature

PTL 1: Japanese Unexamined Patent Application Publication (Translation of PCT Application) No. 2000-513411
PTL 2: Japanese Unexamined Patent Application Publication (Translation of PCT Application) No. 2001-515138
PTL 3: Japanese Unexamined Patent Application Publication (Translation of PCT Application) No. 2001-525487
PTL 4: Japanese Unexamined Patent Application Publication No. 2003-105415

SUMMARY OF INVENTION

Technical Problem

An object of the present invention is to provide an apparatus for manufacturing molten metal in which hanging of a metal agglomerate raw material layer in the furnace is effectively suppressed and, even if the hanging occurs, the hanging is reliably overcome without terminating the furnace operation.

Solution to Problem

A first aspect of the present invention provides an apparatus for manufacturing molten metal, including a stationary non-tilting electric furnace including electric heating means, wherein an exhaust gas duct and a raw material charging chute are connected to a furnace top of the furnace, the raw material charging chute is provided in one end of the furnace in the width direction, the electric heating means is provided such that an electric heating region heated with the electric heating means is in the other end of the furnace in the width direction, a secondary combustion burner is provided in the furnace top; the apparatus is configured to manufacture molten metal by forming a raw material layer by charging a particular amount of a carbonaceous material and/or a metal agglomerate raw material into the furnace from the raw material charging chute, the raw material layer having a sloping surface extending downward from the one end of the furnace in the width direction toward the electric heating region, by subsequently forming a metal agglomerate raw material layer on the sloping surface of the raw material layer by continuously or intermittently charging the metal agglomerate raw material into the furnace from the raw material charging chute, and by subsequently forming a molten metal layer and a molten slag layer in the furnace by sequentially melting the metal agglomerate raw material near a lower end portion of the metal agglomerate raw material layer by electric heating with the electric heating means while allowing the metal agglomerate raw material layer to descend along the sloping surface of the raw material layer, and concurrently thermally reducing the metal agglomerate raw material layer by radiant heat from secondary combustion by blowing oxygen-containing gas into a space, within the furnace, above the metal agglomerate raw material layer from the secondary combustion burner to burn CO-containing gas generated from the metal agglomerate raw material layer; and a shock generator that mechanically overcomes hanging of the metal agglomerate raw material layer is disposed, within the furnace, above the molten slag layer and below the surface of the metal agglomerate raw material layer.

A second aspect of the present invention provides an apparatus for manufacturing molten metal, including a stationary non-tilting electric furnace including electric heating means, wherein an exhaust gas duct and raw material charging chutes are connected to a furnace top of the furnace, the raw material charging chutes are provided in both ends of the furnace in the width direction, the electric heating means is provided such that an electric heating region heated with the electric heating means is in a center position of the furnace in the width direction, a secondary combustion burner is provided in the furnace top; the apparatus is configured to manufacture molten metal by forming a raw material layer by charging a particular amount of a carbonaceous material and/or a metal agglomerate raw material into the furnace from the raw material charging chutes provided in both ends of the furnace in the width direction, the raw material layer having sloping surfaces extending downward from both ends of the furnace in the width direction toward the electric heating region, by subsequently forming a metal agglomerate raw material layer on the sloping surfaces of the raw material layer by continuously or intermittently charging the metal agglomerate raw material into the furnace from the raw material charging chutes provided in both ends of the furnace in the width direction, and by subsequently forming a molten metal layer and a molten slag layer in the furnace by sequentially melting the metal agglomerate raw material near a lower end portion of the metal agglomerate raw material layer by electric heating with the electric heating means while allowing the metal agglomerate raw material layer to descend along the sloping surfaces of the raw material layer, and concurrently heating the metal agglomerate raw material layer by radiant heat from secondary combustion by blowing oxygen-containing gas into a space, within the furnace, above the metal agglomerate raw material layer from the secondary combustion burner to burn CO-containing gas generated from the metal agglomerate raw material layer; and a shock generator that mechanically overcomes hanging of the metal agglomerate raw material layer is disposed, within the furnace, above the molten slag layer and below the surface of the metal agglomerate raw material layer.

When the metal agglomerate raw material charged from the raw material charging chute into the furnace contains 2 mass % or more of small grains having a size that is 90% or less of an average size of all the grains of the metal agglomerate raw material, the shock generator may be disposed at a height between the lower end of the raw material charging chute and a height that is lower than the lower end of the raw material charging chute by ⅓ of the distance between the lower end of the raw material charging chute and the surface of the molten slag layer.

The shock generator may include a shaft having a rotational axis lying in the longitudinal direction of the furnace and a disintegrating member protruding from the surface of the shaft.

The shock generator may rotate about the rotational axis in one direction only in which the metal agglomerate raw material layer descends or alternately in the direction in which the metal agglomerate raw material layer descends and in a direction opposite to the direction.

The shock generator may be disposed such that the shaft is located within the raw material layer or the metal agglomerate raw material layer, and at least a portion of the disintegrating member is in contact with the metal agglomerate raw material layer.

The shock generator may be disposed at a height between the surface of the molten slag layer and a height that is higher than the surface of the molten slag layer by ⅓ of the distance between the surface of the molten slag layer and the lower end of the raw material charging chute.

Advantageous Effects of Invention

According to the present invention, a shock generator is disposed, within the furnace, above the molten slag layer and below the surface of the metal agglomerate raw material layer, that is, within the metal agglomerate raw material layer or the raw material layer. Thus, the shock generator can be continuously or intermittently operated to apply an external force to the metal agglomerate raw material layer directly or indirectly via the raw material layer. Accordingly, hanging of the metal agglomerate raw material layer is effectively suppressed and, even if the hanging occurs, the hanging is rapidly and reliably overcome without terminating the operation of the apparatus for manufacturing molten metal.

DESCRIPTION OF EMBODIMENTS

Hereinafter, an embodiment of the present invention will be described in detail with reference to drawings.

Figure 1A:
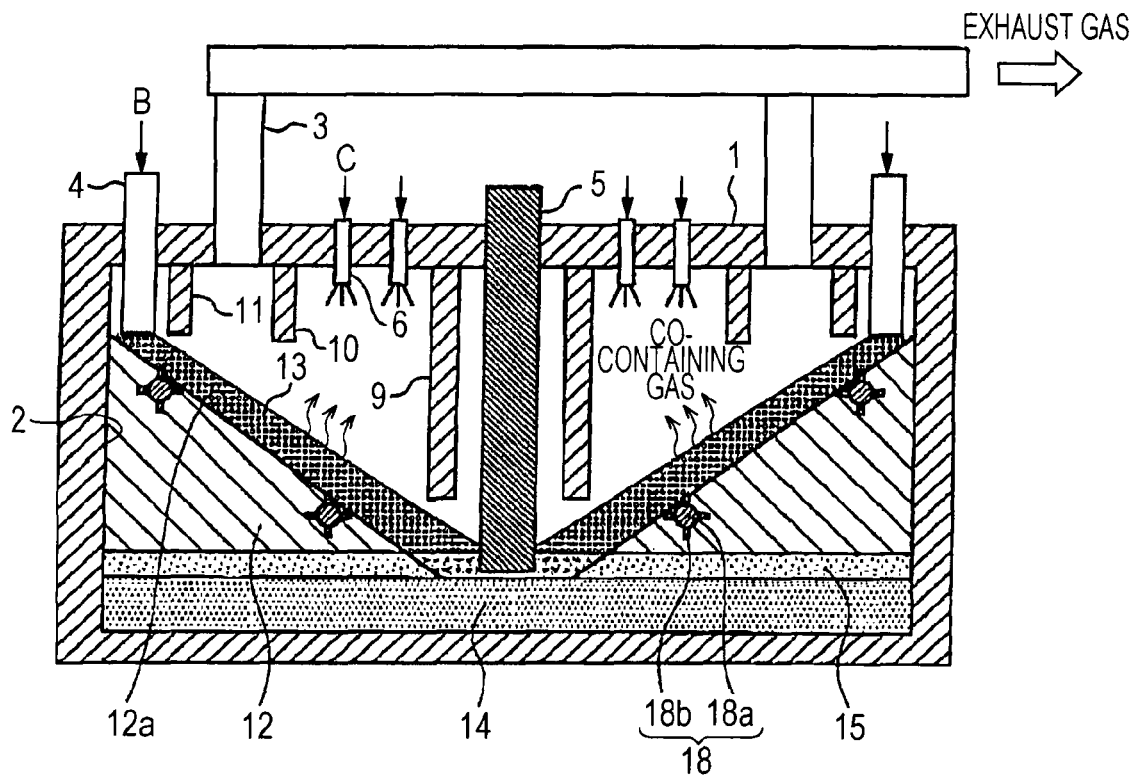
FIG. 1A is a cross-sectional view in the width direction, illustrating an outline configuration of an apparatus for manufacturing molten metal according to an embodiment of the present invention.
Figure 1B:
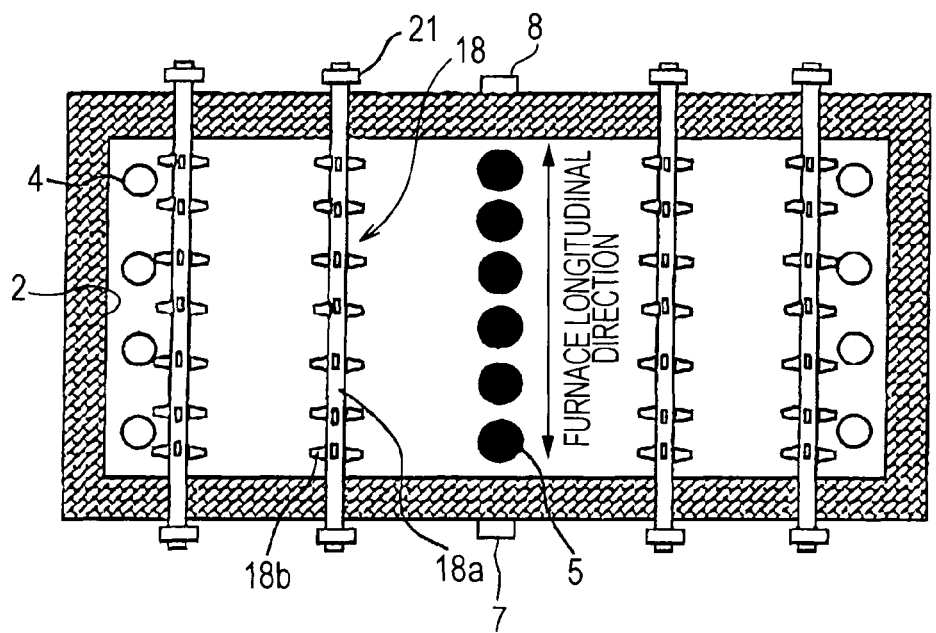
FIG. 1B is a partial horizontal-sectional view illustrating an outline configuration of an apparatus for manufacturing molten metal according to an embodiment of the present invention.
Figure 2A:
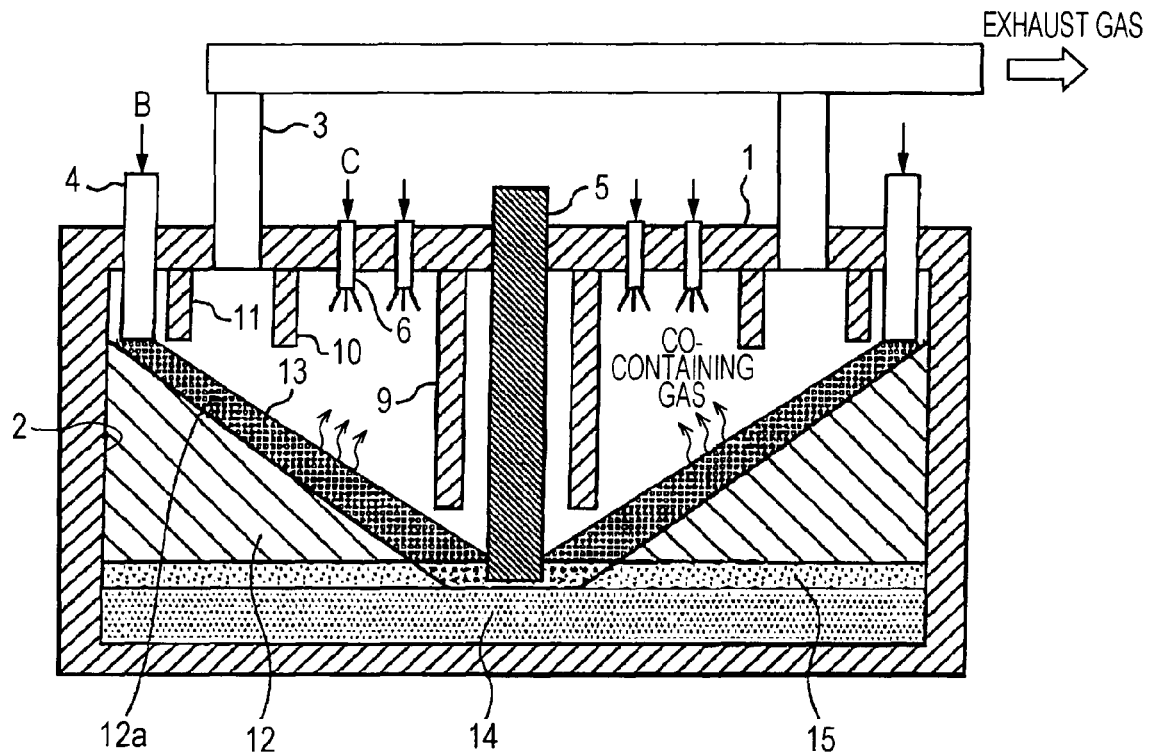
FIG. 2A is a cross-sectional view in the width direction, illustrating an outline configuration of an apparatus for manufacturing molten metal according to the earlier invention.
Figure 2B:
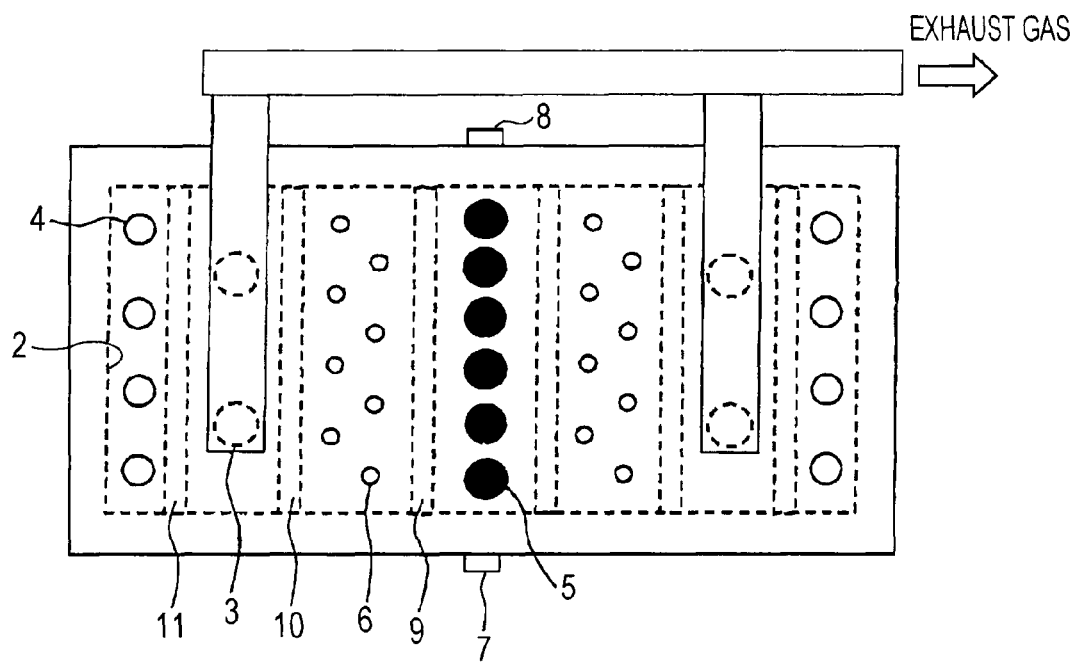
FIG. 2B is a plan view illustrating an outline configuration of an apparatus for manufacturing molten metal according to the earlier invention.

FIGS. 1A and 1B illustrate an outline configuration of an apparatus for manufacturing molten metal according to an embodiment of the present invention. The apparatus of the embodiment has the same configuration as the apparatus for manufacturing molten metal according to the earlier invention in FIGS. 2A and 2B except for a shock generator 18 described below.

A stationary non-tilting electric furnace (also simply referred to as "furnace" hereinafter) according to the embodiment is an arc furnace having a predominately rectangular shape in a horizontal cross-section. An exhaust gas duct 3 and raw material charging chutes 4 are connected to the furnace top (furnace top 1 in the embodiment). Electrodes 5 are inserted through the furnace top 1 into the furnace. The raw material charging chutes 4 are provided in both ends 2 of the furnace in the width direction while the electrodes 5 are provided in the center position of the furnace in the width direction. Secondary combustion burners 6 are provided in the furnace top (furnace top 1 in the embodiment).

Unlike the apparatus for manufacturing molten metal according to the earlier invention, the shock generator 18 that mechanically overcomes hanging of a metal agglomerate raw material layer 13 is disposed, within the furnace, above the surface of a molten slag layer 15 and below the surface of the metal agglomerate raw material layer 13, that is, within the metal agglomerate raw material layer 13 or a raw material layer 12. The "shock generator" is a device that continuously or intermittently applies an external force to the metal agglomerate raw material layer 13.

Thus, the shock generator 18 is disposed within the metal agglomerate raw material layer 13 or the raw material layer 12. The shock generator 18 can be continuously or intermittently operated to apply an external force to the metal agglomerate raw material layer 13 directly or indirectly via the raw material layer 12. Accordingly, hanging of the metal agglomerate raw material layer 13 is suppressed and, even if the hanging occurs, the hanging is rapidly and reliably overcome without terminating the operation of the apparatus for manufacturing molten metal.

The shock generator 18 sufficiently provides the effect of suppressing the hanging as long as it is disposed, within the furnace, above the surface of the molten slag layer 15 and below the surface of the metal agglomerate raw material layer 13, that is, within the metal agglomerate raw material layer 13 or the raw material layer 12. However, when metal agglomerate raw material B charged from the raw material charging chute 4 into the furnace contains 2 mass % or more of small grains having a size that is 90% or less of an average size of all the grains of the metal agglomerate raw material B, the shock generator 18 is preferably disposed at a height between the lower end of the raw material charging chute 4 and a height that is lower than the lower end of the raw material charging chute 4 by ⅓ of the distance between the lower end of the raw material charging chute 4 and the surface of the molten slag layer 15.

As a result, hanging near a region directly below the raw material charging chute 4 due to accumulation of small grains can be effectively suppressed.

Specifically, in a case where metal agglomerate raw material B to be charged into the furnace contains a large amount of small grains such as powder, when metal agglomerate raw material B is charged from the raw material charging chute 4 into the furnace, the small grains tend to accumulate near a region directly below the raw material charging chute 4. In addition, small grains are easily metalized and accrete by heating in the furnace. As a result, hanging tends to occur near a region directly below the raw material charging chute 4.

To avoid such a problem, metal agglomerate raw material B may be charged into the furnace after metal agglomerate raw material B is completely screened with a sieve or the like in advance so as to have a grain size within a narrow range. In this case, the problem of hanging in the furnace is avoided, but the production yield of metal agglomerate raw material B is decreased, resulting in another problem of an increase in the production cost of molten metal.

Thus, the shock generator 18 is disposed near a region directly below the raw material charging chute 4. As a result, hanging due to accumulation of small grains can be effectively suppressed without decreasing the production yield of metal agglomerate raw material B.

The shock generator 18 may be constituted by, for example, a shaft 18a having a rotational axis lying in the longitudinal direction of the furnace and disintegrating members 18b protruding from the surface of the shaft 18a (the shock generator 18 may be similar to a burden feeder that is disposed within a shaft furnace for Midrex direct reduction process and is used to prevent hanging of reduced iron). By rotating the shaft 18a of the shock generator 18 continuously or intermittently at regular intervals, hanging of the metal agglomerate raw material layer 13 can be suppressed. Even if hanging of the metal agglomerate raw material layer 13 occurs, sintered or fused metal agglomerate raw material B can be disintegrated with the disintegrating members 18b protruding from the shaft 18a; even when the sintered or fused material is not sufficiently disintegrated, the metal agglomerate raw material layer 13 can be forcedly transported downward (lowered) toward the lower portions of the electrodes 5 before the sintered or fused material becomes coarse; accordingly, the operation can be smoothly performed for a long period of time.

To effectively provide such a function in response to the occurrence of hanging, the shock generator 18 that is similar to the burden feeder may be properly selected from a shock generator that rotates about its rotational axis in one direction (normal direction) only in which the metal agglomerate raw material layer 13 descends and a shock generator that alternately rotates about its rotational axis in the direction (normal direction) in which the metal agglomerate raw material layer 13 descends and in the opposite direction. The former shock generator is intended to perform transportation, whereas the latter shock generator is intended to perform disintegration.

The shock generator 18 similar to a burden feeder (the shock generator 18 being constituted by the shaft 18a having a rotational axis lying in the longitudinal direction of the furnace and the disintegrating members 18b protruding from the surface of the shaft 18a) sufficiently provides the effect of suppressing the hanging as long as it is disposed, within the furnace, above the molten slag layer 15 and below the surface of the metal agglomerate raw material layer 13, that is, within the metal agglomerate raw material layer 13 or the raw material layer 12. In particular, the shock generator 18 is preferably disposed such that the shaft 18a is located within the raw material layer 12 or the metal agglomerate raw material layer 13, and at least a portion of the disintegrating member 18b is in contact with the metal agglomerate raw material layer 13.

As a result, as the shaft 18a is rotated, the disintegrating member 18b directly applies an external force to the metal agglomerate raw material layer 13. Thus, the hanging can be more efficiently suppressed.

The shock generator 18 similar to a burden feeder is preferably disposed at a height between the surface of the molten slag layer 15 and a height that is higher than the surface of the molten slag layer 15 by ⅓ of the distance between the surface of the molten slag layer 15 and the lower end of the raw material charging chute 4.

When the shock generator 18 similar to a burden feeder is thus disposed at a position where the metal agglomerate raw material tends to be metalized and softened and the hanging tends to be caused, the effect of suppressing the hanging can be more efficiently provided.

Partition walls 9, 10, and 11 that are suspended in the furnace are preferably provided between the electrodes 5 and the secondary combustion burners 6, between the secondary combustion burners 6 and the exhaust gas duct 3, and between the exhaust gas duct 3 and the raw material charging chutes 4.

It is preferable to provide the partition walls 9 between the electrodes 5 and the secondary combustion burners 6 to prevent the oxidizing exhaust gas after secondary combustion from contacting the electrodes 5.

It is preferable to provide the partition walls 10 between the secondary combustion burners 6 and the exhaust gas duct 3 to prevent the exhaust gas after secondary combustion from short-cutting to the exhaust gas duct 3 and to transfer a sufficient amount of radiant heat to the metal agglomerate raw material layer 13.

It is preferable to provide the partition walls 11 between the exhaust gas duct 3 and the raw material charging chutes 4 to prevent damage on the raw material charging chutes 4 caused by overheating with hot exhaust gas.

All or some of the partition walls 9, 10, and 11 may be installed by comprehensively considering the effects of partition installation, installation costs, maintenance work, etc.

The exhaust gas duct 3 is preferably provided closer to the raw material charging chutes 4 than to the electrodes 5. This is to suppress oxidizing exhaust gas after secondary combustion from flowing toward the electrodes 5 and to thereby suppress damage on the electrodes 5.

In the furnace bottom, a tap hole 7 and a slag tap hole 8 are preferably provided in furnace side walls in the furnace longitudinal direction where the raw material charging chutes 4 are not provided (i.e., where raw material layers 12 are not provided in the furnace). This is to facilitate the hole-opening operation during the tapping of molten metal and the slag.

Common heat-exchangers (not shown) may be installed downstream of the exhaust gas duct 3 to recover the sensible heat of the hot exhaust gas discharged from the furnace and to efficiently utilize the recovered sensible heat as the energy for pre-heating oxygen-containing gas for the secondary combustion burners, generating electricity for the arc, drying pellets B, etc.

The electrodes 5 are preferably of a three-phase alternating current type that is excellent in terms of heat efficiency and commonly used in steel-making electric arc furnaces. For example, a configuration of six electrodes is preferably employed, which consists of three pairs of each single phase constituted by a three-phase electrode.

Tip portions of the electrodes 5 are preferably positioned (submerged) in the metal agglomerate raw material layer 13 or the molten slag layer 15 while conducting the melting operation. As a result, the melting can be accelerated by the effects of radiant heat and resistance heat by arcs, and the damage on the inner surface of furnace walls which are not protected with the raw material layer 12 can be suppressed.

Hereinafter, as an example, the case in which this stationary non-tilting arc furnace is used to manufacture molten iron as molten metal will be described. In this example, carbon composite iron oxide pellets are used as the raw material for forming the raw material layer in the furnace, and the carbon composite iron oxide pellets are also used as the metal agglomerate raw material on the raw material layer.

In a method for manufacturing molten metal, a particular amount of carbon composite iron oxide pellets A are charged as the raw material for forming the raw material layer from the raw material charging chutes 4 installed in both ends 2 of the furnace in the width direction. The carbon composite iron oxide pellets A form the raw material layer 12 having a sloping surface 12a extending downward from both ends 2 of the furnace in the width direction toward the lower end portions of the electrodes 5. When the metal agglomerate raw material such as the carbon composite iron oxide pellets is used for forming the raw material layer 12 instead of the carbonaceous material, reduction and melting or carburization and dissolution occurs in the portion that comes in contact with the molten iron. However, heat does not readily conduct to portions far from the portion contacting the molten iron, and the metal agglomerate raw material remains in a solid state. Thus, the raw material layer 12 once formed remains in a layer state for a long time. Moreover, since the temperature in the raw material layer 12 decreases as the distance from the region contacting the molten iron increases and the distance to the furnace wall decreases, damage on the refractory caused by formation of molten FeO does not pose a problem.

Next, carbon composite iron oxide pellets (also simply referred to as "pellets" hereinafter) B as the metal oxide agglomerates with carbonaceous material serving as the metal agglomerate raw material are continuously or intermittently charged from the raw material charging chutes 4 installed in both ends 2 of the furnace in the width direction so as to form a pellet layer 13 as a metal agglomerate raw material layer on the sloping surface 12a of the raw material layer 12. The amount of the carbonaceous material contained in the pellets B may be determined on the basis of the theoretically required C amount for reducing iron oxide to metallic iron, and the target C concentration of molten iron. The pellets B are preferably dried in advance so that they do not burst when charged into the furnace.

As described above, the heights of the electrodes 5 are preferably adjusted in advance so that the lower end portions thereof are submerged in the pellet layer 13.

As electricity is then supplied to the electrodes to conduct arc heating, the pellets B near the lower end portion of the pellet layer 13 become sequentially reduced, melted, and separate into molten iron as molten metal and molten slag by being rapidly heated, i.e., form a molten iron layer 14 and a molten slag layer 15 on the furnace bottom. Preferably, a CaO source or a MgO source such as limestone or dolomite is mixed into the pellets B in advance to adjust the basicity or the like of the molten slag layer 15.

The pellets B sequentially melt from near the lower end portion of the pellet layer 13 as described above and the pellet layer 13 starts to sequentially descend in the furnace by gravity and by the raw material transport function of the shock generator 18 toward the lower end portions of the electrodes 5 along the sloping surface of the raw material layer.

As the pellets B in the pellet layer 13 approach the electrodes 5, the pellets B are efficiently heated by radiant heat and resistance heat generated by arcs from the electrodes 5, the iron oxide inside the pellets B is pre-reduced to solid metallic iron by the carbonaceous material contained in the pellets B, and CO-containing gas (combustible gas) is generated. When a carbonaceous material, such as coal, having a volatile component is used, the volatile component evaporated from this carbonaceous material by heating is also added to the CO-containing gas.

The CO-containing gas is burned (secondary combustion) by oxygen-containing gas, e.g., oxygen gas, blown from the secondary combustion burners 6 installed in the furnace top 1. The radiant heat generated by the combustion (secondary combustion) also heats the pellet layer 13. As the pellet layer 13 is thus heated by radiant heat, iron oxide in the pellets is pre-reduced to solid metallic iron and CO-containing gas is generated as in the case of radiant heating and resistance heating with arcs from the electrodes 5; thus, radiant heating by the secondary combustion is further accelerated.

As described above, the pellets B charged into the furnace from the raw material charging chutes 4 are pre-reduced in a solid state by radiant heating caused by the secondary combustion (hereafter, also referred to as "secondary combustion heat") as they descend on the sloping surface 12a of the raw material layer 12 until the metallization becomes higher, then they are melted by arc heat and resistance heat near the lower end portions of the electrodes 5, and are separated into molten iron and molten slag.

Accordingly, the iron oxide concentration in the molten slag generated near the lower end portions of the electrodes 5 becomes sufficiently low and wear of the electrodes 5 can be suppressed.

The carbonaceous material remaining in the pellets B is dissolved into the molten iron separated from molten slag, to thereby form molten iron having a target C concentration.

The molten iron and molten slag manufactured as such can be intermittently discharged from the tap hole 7 and the slag tap hole 8 in the furnace bottom in the same manner as tapping methods for blast furnaces, for example.

In the aforementioned embodiment, a device (constituted by the shaft 18a and disintegrating members 18b protruding from the surface of the shaft 18a) that applies an external force to the metal agglomerate raw material layer 13 by rotation about the rotational axis and is similar to a burden feeder is described as an example of the shock generators 18. However, the shock generators 18 are not limited to the device and any device that can continuously or intermittently apply an external force to the metal agglomerate raw material layer 13 may be used. For example, another device (e.g. screw device) that applies an external force by rotation about the rotational axis may be used. Alternatively, a device (e.g. pusher device) that applies an external force by reciprocation of a cylinder or the like may be used. Alternatively, a device that applies an external force by gas pressure may be used such as a device that directly blows gas into the furnace or a device that deforms a diaphragm by gas pressure.

As for the arrangement of the raw material charging chutes 4 and the electrodes 5 in the aforementioned embodiment, an example in which the raw material charging chutes 4 are installed in both ends 2 of the furnace in the width direction and the electrodes 5 are installed in the center position of the furnace top 1 in the furnace width direction is described; alternatively, the raw material charging chutes 4 may be installed in one end 2 of the furnace in the width direction and the electrodes 5 may be installed in the other end 2 of the furnace in the width direction. When this modification is employed, the slope of the raw material layer 12 that is formed in the furnace is provided on one side only. This is a disadvantage from the viewpoint of refractory protection compared to the aforementioned embodiment; however, there are also advantages in that the furnace width can be reduced and thus the facility can be made more compact. In the aforementioned embodiment, an example in which the electrodes 5 are installed on the center line of the furnace in the width direction is described as an example in which the electrodes 5 are installed in the center position of the furnace in the width direction. However, the electrodes 5 are not necessarily installed accurately on the center line of the furnace in the width direction and may be installed at positions closer to ends of the furnace in the width direction with respect to the center line of the furnace in the width direction.

In the aforementioned embodiment, an example in which the exhaust gas duct 3 and the raw material charging chutes 4 are connected to the furnace top 1 is described. However, the arrangement is not limited to this and one or both of the exhaust gas duct 3 and the raw material charging chutes 4 may be connected to upper portions of the furnace side walls. In the case where the raw material charging chutes 4 are connected to the upper portions of the furnace side walls, the raw material charging chutes 4 are automatically installed in ends of the furnace in the width direction.

In the aforementioned embodiment, an example in which the stationary non-tilting arc furnace has a predominately rectangular shape in a horizontal cross-section is described, but the shape is not limited to this. For example, a furnace having a round or predominately elliptical cross-section may be used. In such a case, three electrodes may be employed for a three-phase power supply instead of the 3 pairs of single-phase electrodes. However, when the furnace with a predominately rectangular cross-section is used, there is an advantage that the scale of the furnace can be easily increased by extending the furnace in the longitudinal direction (the direction perpendicular to the furnace width direction) without changing the furnace width.

Although pellets are used as an example of the metal oxide agglomerates with carbonaceous material B in the aforementioned embodiment, briquettes may be employed. Since briquettes have a greater angle of repose than spherical pellets, the furnace height must be increased in order to secure the residence time on the sloping surface 12a of the raw material layer 12 compared to the case of using pellets, but there is an advantage that the furnace width can be reduced.

In the aforementioned embodiment, an example in which the metal oxide agglomerates with carbonaceous material (carbon composite iron oxide pellets) only are used as the metal agglomerate raw material is described. Alternatively, the metal agglomerate raw material may be, instead of the metal oxide agglomerates with carbonaceous material (carbon composite iron oxide pellets and carbon composite iron oxide briquettes), metal scrap (iron scrap), reduced metal (reduced iron [DRI or HBI]), metal oxide agglomerate ore (agglomerate iron ore), metal chloride agglomerates with carbonaceous material that contain a metal chloride, or metal oxide ore agglomerates (baked iron oxide pellets, cold bonded iron oxide pellets, or iron oxide sintered ore). Alternatively, the metal agglomerate raw material may be one or more selected from the group consisting of metal oxide agglomerates with carbonaceous material, metal scrap, reduced metal, metal oxide agglomerate ore, metal chloride agglomerates with carbonaceous material, and metal oxide ore agglomerates.

In the aforementioned embodiment, an example in which only iron, i.e., a nonvolatile metal element, is contained in the metal oxide agglomerates with carbonaceous material B is described. Alternatively, in addition to the nonvolatile metal element, volatile metal elements, e.g., Zn, Pb, and the like, may be contained. In other words, steel mill dust containing volatile metal elements can be used as the metal oxide raw material in the metal oxide agglomerates with carbonaceous material B. Volatile metal elements evaporate from the metal oxide agglomerates with carbonaceous material B by being heated in the furnace. According to a method of the present invention, the temperature in the furnace top can be maintained sufficiently high with combustion heat generated with the secondary combustion burners 6. Thus, re-condensation of the volatile metal elements evaporated can be assuredly prevented in the furnace top and the volatile metal elements can be efficiently recovered from the exhaust gas discharged from the furnace.

In this specification, a "volatile metal element" refers to a metal element in an elemental form or a compound form such as a salt, having a melting point of 1100° C. or less at 1 atm. Examples of the elemental metal include zinc and lead. Examples of the compound of the volatile metal element include sodium chloride and potassium chloride. The volatile metals in the compounds are reduced to metals in an electric furnace (e.g., an arc furnace or a submerged arc furnace) and part or all of the volatile metals are present in a gas state in the furnace. The chlorides of volatile metal elements are heated in the electric furnace and part or all of the chlorides are present in a gas state in the furnace. In contrast, a "nonvolatile metal element" refers to a metal element in an elemental form or a compound form such as an oxide, having a melting point of more than 1100° C. at 1 atm. Examples of the elemental metal include iron, nickel, cobalt, chromium, and titanium. Examples of the oxides of the nonvolatile metals include CaO, $SiO_2$, and $Al_2O_3$. When an arc furnace or a submerged arc furnace is used as the electric furnace, the compounds of the nonvolatile metal elements can exist in a gas state near the arcs in the furnace (arc temperature region) by taking form of reduced elemental metals or unreduced compounds due to heating or reduction reactions in the furnace, but exist in a liquid or solid state in a region remote from the arcs.

Although only iron (Fe) is used as an example of the metal element constituting the metal oxide agglomerates with carbonaceous material B as the metal agglomerate raw material and the molten metal 14 in the aforementioned embodiment, nonferrous metals such as Ni, Mn, Cr, and the like may be contained in addition to Fe.

In the aforementioned embodiment, adding the CaO source or MgO source to the metal oxide agglomerates with carbonaceous material B in advance is described as an example of the means for adjusting the basicity of the molten slag. Instead of or in addition to such means, limestone or dolomite may be charged from the raw material charging chutes 4 together with the metal oxide agglomerates with carbonaceous material B, or limestone or dolomite may be charged from chutes that are separate from the raw material charging chutes 4 for the metal oxide agglomerates with carbonaceous material B.

Although carbon composite iron oxide pellets are described as an example of a raw material constituting the raw material layer 12 in the aforementioned embodiment, another metal agglomerate raw material may be used or two or more metal agglomerate raw materials may be used in combination.

A carbonaceous material such as coal or coke may be used for forming the raw material layer 12 in addition to or instead of the metal agglomerate raw material. When a carbonaceous material is used as the raw material for forming the raw material layer 12, the size distribution of the carbonaceous material is preferably adjusted according to the size of the carbon composite iron oxide pellets B so that the carbon composite iron oxide pellets B do not penetrate into gaps in the raw material layer 12.

In the aforementioned embodiment, an example in which the tap hole 7 and the slag tap hole 8 are formed in different side walls opposing each other is described. However, the tap hole 7 and the slag tap hole 8 may be installed in the same side wall or the slag tap hole 8 may be omitted and only the tap hole 7 may be formed so that the molten iron and the molten slag can be discharged through the tap hole 7.

While the present invention has been described in detail and with reference to specific embodiments thereof, it will be apparent to one skilled in the art that various changes and modifications can be made without departing from the spirit and scope of the present invention. The present invention contains subject matter related to Japanese Patent Application No. 2009-234364 filed in the Japan Patent Office on Oct. 8, 2009, the entire contents of which are incorporated herein by reference.

REFERENCE SIGNS LIST 1 furnace top
2 end of the furnace in the width direction
3 exhaust gas duct
4 raw material charging chute
5 electrode
6 secondary combustion burner
7 tap hole
8 slag tap hole
9, 10, 11 partition wall
12 raw material layer
12a sloping surface
13 metal agglomerate raw material layer (pellet layer)
14 molten metal layer (molten iron layer)
15 molten slag layer
16 furnace bottom
16a rising portion
17 access hole
18 shock generator
18a shaft
18b disintegrating member
21 bearing
A raw material for forming the raw material layer (carbon composite iron oxide pellets)
B metal agglomerate raw material (metal oxide agglomerates with carbonaceous material, carbon composite iron oxide pellets)
C oxygen-containing gas (oxygen)

The invention claimed is:

1. An apparatus for manufacturing molten metal, comprising:
   a stationary non-tilting electric furnace capable of electric heating,
   an exhaust gas duct and a raw material charging chute connected to a furnace top of the furnace,
   a secondary combustion burner in the furnace top, and
   a shock generator within the furnace,
   wherein the raw material charging chute is in one end of the furnace in a width direction,
   an electric heating region is spaced from the raw material charging chute in the width direction, a material layer having a sloping surface extending downward in the width direction from the one end of the furnace having the raw material charging chute toward the electric heating region, the sloping surface supporting a metal agglomerate raw material layer, wherein the shock generator is provided at least partially within the material having the sloping surface and extends to the sloping surface, to be in contact with the metal agglomerate raw material layer, and to mechanically overcome hanging of the metal agglomerate raw material layer on the sloping surface.

2. An apparatus for manufacturing molten metal, comprising:

a stationary non-tilting electric furnace capable of electric heating, an exhaust gas duct and at least two raw material charging chutes connected to a furnace top of the furnace, a secondary combustion burner in the furnace top, and a shock generator within the furnace, wherein the raw material charging chutes are in either end of the furnace in a width direction, an electric heating region in a center position of the furnace in the width direction, material layers having sloping surfaces and respectively extending downward in the width direction from a respective end of the furnace toward the electric heating region, the sloping surfaces each supporting a metal agglomerate raw material layer, wherein the shock generator is provided at least partially within the material layers having the sloping surface and extends to one of the sloping surfaces, to be in contact with the metal agglomerate raw material layer, and to mechanically overcome hanging of the metal agglomerate raw material layer on the one of the sloping surfaces.

3. An apparatus according to claim 1 or 2, wherein the metal agglomerate raw material charged from the raw material charging chute into the furnace comprises 2 mass % or more of small grains having a size that is 90% or less of an average size of all grains of the metal agglomerate raw material, and wherein the shock generator is at a height between a lower end of the raw material charging chute and a height that is lower than the lower end of the raw material charging chute by ⅓ of a distance between the lower end of the raw material charging chute and a lower end of the material layer having the sloping surface.

4. An apparatus according to claim 1 or 2, wherein the shock generator comprises:

a shaft having a rotational axis in a longitudinal direction of the furnace and a disintegrating member protruding from a surface of the shaft.

5. The apparatus of claim 4, wherein the shock generator is at a height higher than the surface of the molten slag layer by ⅓ of a distance between the surface of the molten slag layer and a lower end of the material layer having the sloping surface.

6. An apparatus according to claim 1 or 2, further comprising a partition wall suspended in the furnace.

7. An apparatus according to claim 1 or 2, wherein the furnace is capable of arc heating by an electrode.

8. An apparatus according to claim 1, wherein said material layer having the sloping surface includes a carbonaceous material.

9. An apparatus according to claim 2, wherein said material layers having the sloping surfaces includes a carbonaceous material.

* * * * *